(12) United States Patent
Wingett et al.

(10) Patent No.: US 9,482,312 B2
(45) Date of Patent: Nov. 1, 2016

(54) ROPE DRIVE ANCHORING ASSEMBLY

(71) Applicant: HONEYWELL INTERNATIONAL INC., Morristown, NJ (US)

(72) Inventors: Paul T. Wingett, Mesa, AZ (US); Steve Abel, Chandler, AZ (US); Steven Talbert Forrest, Phoenix, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 315 days.

(21) Appl. No.: 14/097,517

(22) Filed: Dec. 5, 2013

(65) Prior Publication Data

US 2015/0159739 A1  Jun. 11, 2015

(51) Int. Cl.
| | | |
|---|---|---|
| F16H 27/02 | (2006.01) | |
| F16G 11/04 | (2006.01) | |
| F16H 19/06 | (2006.01) | |
| F16H 19/00 | (2006.01) | |
| G05G 5/03 | (2008.04) | |
| B64C 13/04 | (2006.01) | |
| B64C 13/46 | (2006.01) | |
| G05G 9/047 | (2006.01) | |

(52) U.S. Cl.
CPC .............. *F16G 11/04* (2013.01); *B64C 13/04* (2013.01); *B64C 13/46* (2013.01); *F16H 19/005* (2013.01); *F16H 19/0672* (2013.01); *G05G 5/03* (2013.01); *G05G 2009/04718* (2013.01); *Y10T 24/3969* (2015.01); *Y10T 74/18848* (2015.01)

(58) Field of Classification Search
CPC ....... F16G 11/04; B64C 13/04; B64C 13/46; F16H 19/005; F16H 19/0672; G05G 5/03
See application file for complete search history.

(56) References Cited

U.S. PATENT DOCUMENTS

| | | | | |
|---|---|---|---|---|
| 1,740,982 | A * | 12/1929 | Hillier | F16G 11/04 24/115 M |
| 3,254,699 | A * | 6/1966 | Wanner | E05F 15/686 160/193 |
| 4,449,053 | A | 5/1984 | Kutcher | |
| 5,249,544 | A * | 10/1993 | Lacan | B63H 9/10 114/204 |
| 5,334,109 | A * | 8/1994 | Izutsu | F16H 7/1218 474/135 |
| 5,769,558 | A * | 6/1998 | Jekielek | E21B 17/04 175/73 |
| 2006/0173330 | A1* | 8/2006 | Kim | A61B 8/08 600/445 |
| 2008/0121854 | A1* | 5/2008 | Kochan | B66D 1/30 254/372 |
| 2011/0272377 | A1* | 11/2011 | Willim | B66C 23/185 212/285 |
| 2012/0065515 | A1* | 3/2012 | Sato | A61B 8/12 600/459 |
| 2015/0300464 | A1* | 10/2015 | Sugahara | F16H 19/0672 74/89.2 |

OTHER PUBLICATIONS

Peak Well Services—Peak UHD Multi-Function Shear Pin Rope Socket; URL: http://www.qserv.com/uploads/a---multi-function-rope-socket.pdf.

* cited by examiner

*Primary Examiner* — William Kelleher
*Assistant Examiner* — Zakaria Elahmadi
(74) *Attorney, Agent, or Firm* — Lorenz & Kopf, LLC

(57) ABSTRACT

A rope drive anchoring assembly includes a pulley, a rope, and a rope connector. The pulley is adapted to be rotationally mounted and has an inner surface, an outer surface, and a fastener opening extending between the inner and outer surfaces. The rope engages at least a portion of the outer surface of the pulley and is adapted to receive a drive torque, which causes the pulley to rotate. The rope connector couples the rope to the pulley, and includes a fastener, a threaded bolt, and a spring. The fastener extends through the fastener opening, and has a first end, a second end, an outer surface, and an opening through which the rope extends. The threaded bolt is threaded onto the fastener threads, and the spring is disposed between the threaded bolt and the inner surface of the pulley.

12 Claims, 3 Drawing Sheets

ROPE DRIVE ANCHORING ASSEMBLY

TECHNICAL FIELD

The present invention generally relates to drive systems, and more particularly relates to a rope drive anchoring assembly.

BACKGROUND

Human-machine interfaces that are used to translate human movements to machine movements are used in myriad industries. For example, some aircraft flight control systems include a human-machine interface in the form of one or more control sticks. The flight control system, in response to input forces supplied to the control stick from the pilot, controls the movements of various aircraft flight control surfaces. No matter the particular end-use system, the human-machine interface preferably includes some type of haptic feedback mechanism back through the interface to the interface operator (e.g., pilot or co-pilot). In some implementations, the haptic feedback mechanisms are active mechanisms that include one or more electrically controlled motors that supply force feedback to the human-machine interface, typically via multiple gear stages that exhibit relatively high gear ratios.

Although useful and robust, feedback mechanisms that include multiple gear stages do exhibit certain drawbacks. For example, these gear stages, which are typically implemented using multi-stage planetary gears or harmonic drives, increase overall feedback mechanism inertia and friction, which can adversely affect overall system efficiency. Moreover, these multiple gear stages can be relatively heavy and complex and, as a result, relatively expensive. There has thus been a desire to use relatively lighter and less complex mechanisms for interconnecting the motors and the control stick.

One solution that has been proposed is to replace the gear stages with a rope drive system. This solution, however, exhibits its own drawbacks, which are typically associated with the manner in which the rope is anchored. In particular, the rope can exhibit poor adjustability, and over time may exhibit creep (stretching), breakage, thermal growth (shrinkage), and backlash (loss of tension). Hence, there is a need for a rope drive anchoring system that addresses at least these drawbacks.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a rope drive anchoring assembly includes a pulley, a rope, and a rope connector. The pulley is adapted to be rotationally mounted and has an inner surface, an outer surface, and a fastener opening extending between the inner and outer surfaces. The rope engages at least a portion of the outer surface of the pulley. The rope is adapted to receive a drive torque and, in response, causes the pulley to rotate. The rope connector couples the rope to the pulley, and includes a fastener, a threaded bolt, and a spring. The fastener extends through the fastener opening, and has a first end, a second end, an outer surface, and an opening extending between the first and second ends and through which the rope extends. The outer surface has fastener threads formed on at least a portion thereof. The threaded bolt is threaded onto the fastener threads, and the spring is disposed between the threaded bolt and the inner surface of the pulley.

In another embodiment, a drive system includes a motor, a pulley, a rope, and a rope connector. The motor has an output shaft, and is adapted to be energized and is configured, upon being energized, to supply a drive torque via the output shaft. The pulley is adapted to be rotationally mounted and has an inner surface, an outer surface, and a fastener opening extending between the inner and outer surfaces. The rope engages the output shaft and at least a portion of the outer surface of the pulley. The rope is responsive to the drive torque to cause the pulley to rotate. The rope connector couples the rope to the pulley, and includes a fastener, a threaded bolt, and a spring. The fastener extends through the fastener opening, and has a first end, a second end, an outer surface, and an opening extending between the first and second ends and through which the rope extends. The outer surface has fastener threads formed on at least a portion thereof. The threaded bolt is threaded onto the fastener threads, and the spring is disposed between the threaded bolt and the inner surface of the pulley.

In yet another embodiment, the drive system includes a motor, a pulley, a rope, and a rope connector. The motor has an output shaft, and is adapted to be energized and is configured, upon being energized, to supply a drive torque via the output shaft. The pulley is adapted to be rotationally mounted and has an inner surface, an outer surface, and a fastener opening extending between the inner and outer surfaces. The rope engages the output shaft and at least a portion of the outer surface of the pulley. The rope is responsive to the drive torque to cause the pulley to rotate. The rope connector couples the rope to the pulley, and includes a fastener, a threaded bolt, and a spring. The fastener extends through the fastener opening, and has a first end, a second end, an outer surface, and an opening extending between the first and second ends and through which the rope extends. The outer surface has fastener threads formed on at least a portion thereof. The threaded bolt is threaded onto the fastener threads, and the spring is disposed between the threaded bolt and the inner surface of the pulley.

Furthermore, other desirable features and characteristics of the rope drive system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In addition, although embodiments of a rope drive system and an associated rope drive anchoring system are described as being implemented in a user interface that is configured as a control stick, it will be appreciated that the anchoring system could be implemented in variously configured user interfaces including, for example, variously configured pedals, yokes, levers, and the like. It will additionally be appreciated that the anchoring system could be implemented in various other systems and devices that are (or could be) implemented with a rope drive system.

Figure 1:
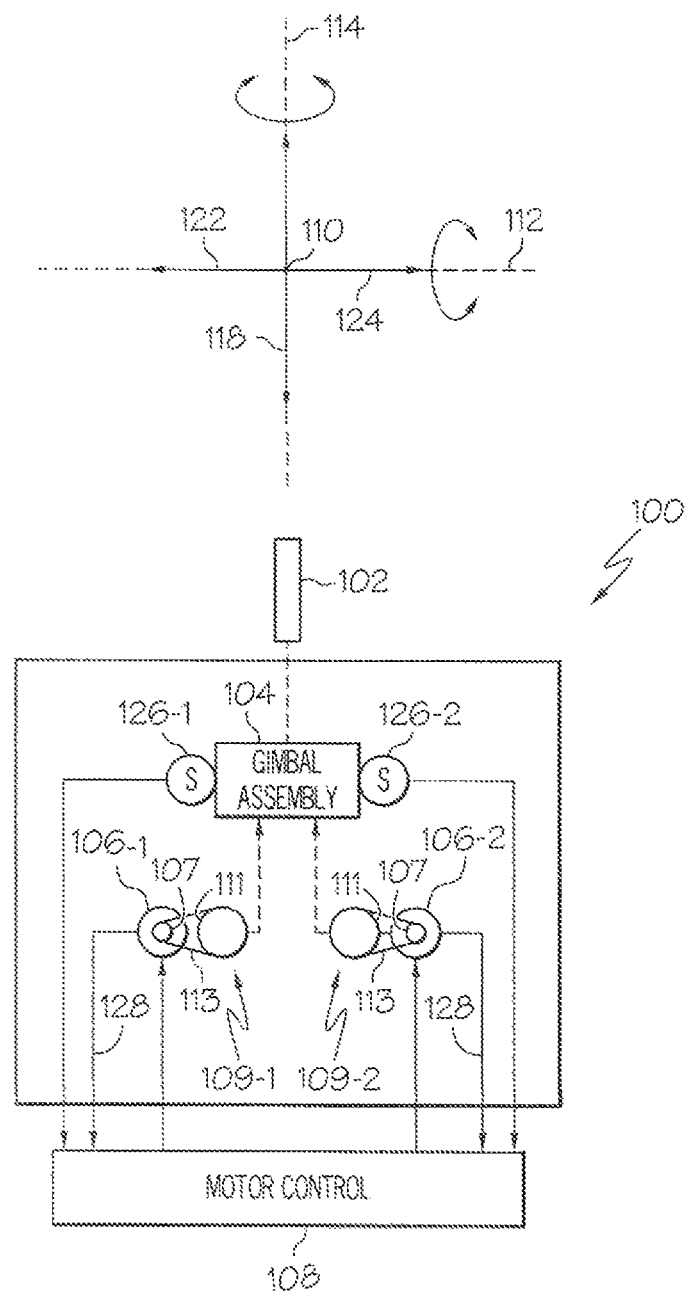
FIG. 1 depicts a functional block diagram of an exemplary active human-machine interface system.

Referring now to FIG. 1, a functional block diagram of an exemplary active human-machine interface system 100 is depicted. The system 100 includes a user interface 102, a gimbal assembly 104, a plurality of motors 106 (e.g., 106-1, 106-2), a motor control 108, and a plurality of rope drive mechanisms 109 (109-1, 109-2). The user interface 102 is coupled to the gimbal assembly 104 and is configured to move, in response to an input from a user, from a null position 110 to a plurality of control positions in a plurality of movement directions.

The gimbal assembly 104, which preferably mounted within a housing 101, is coupled to the user interface 102 and is configured to rotate, upon movement of the user interface 102, about two perpendicular and co-planar rotational axes—a first rotational axis 112 and a second rotational axis 114. Thus, if a user moves the user interface 102 in a forward direction 116 or an aft direction 118, the gimbal assembly 104 rotates about the second rotational axis 114. Similarly, if a user moves the user interface in a left direction 122 or a right direction 124, the gimbal assembly 104 rotates about the first rotational axis 112. It will be appreciated that gimbal assembly 104 is additionally configured to allow the user interface 102 to be moved in a combined forward-left direction, a combined forward-right direction, a combined aft-left direction, or a combined aft-right direction, and back to or through the null position 110.

Movement of the user interface 102 is sensed via a plurality of user interface sensors 126 (e.g., 126-1, 126-2). The user interface sensors 126 may be coupled to the user interface 102, the gimbal assembly 106, or to both, and are configured to supply user interface movement signals 127. The user interface sensors 126 may be variously implemented using any one of numerous known force sensors, position sensors, or both. Some suitable force sensors include, but are not limited to, strain gage sensors, piezoelectric sensors, semiconductor sensors, or optical sensors, just to name a few, and suitable position sensors include, but are not limited to, absolute inceptor position sensors such as RVDTs, LVDTs, potentiometers, optical sensors, or magneto-resistance (MR) type position sensors, just to name a few. No matter the specific number and type of user interface sensors 126, at least one of the sensors 126 is configured to supply user interface movement signals 127 representative of a vector component of user interface movement along the first rotational axis 112 (e.g., in the forward or aft directions 116, 118), and another sensor 126 is configured to supply user interface movement signals 127 representative of a vector component of user interface movement along the second rotational axis 114 (e.g., in the left or right directions 122, 124). In the depicted embodiment, the user interface movement signals 127 are supplied to the motor control 108.

The motors 106 are each configured, upon being energized, to selectively supply a motor torque about the first rotational axis 112. In the depicted embodiment, the plurality of motors 106 includes a first motor 106-1 and a second motor 106-2. Thus, the first motor 106-1 is configured to selectively supply a first motor torque, and the second motor 106-2 is configured to selectively supply a second motor torque. The motors 106 are preferably identical, and are preferably implemented using multi-phase brushless DC machines. As such, current feedback and commutation signals 128 associated with each motor 106 may also be supplied to the motor control 108.

The motor control 108, in response to the user interface movement signals 127 and the current feedback and commutation signals 128, selectively energizes one or both of the motors 106-1, 106-2 to rotate. Whether one or both of the motors 106 are energized, and the direction in which the motor control 108 causes the motors 106 to rotate, depends upon the directional movement of the user interface 102. It will be appreciated that although the motor control 108 is depicted using a single functional block, its functionality could be implemented using two individual motor controls, one associated with each motor 106.

The rope drive systems 109 are each associated with a different one of the motors 106, and are interconnected between the gimbal assembly 104 and its associated motor 106. The rope drive systems 109 are each configured to receive the torque generated by its associated motor 106 and transfer the generated torque to the gimbal assembly 104. It will be appreciated that the rope drive systems 109 may be variously configured and implemented, but in the depicted embodiment each rope drive system 109 includes a pulley 111 (111-1, 111-2) and a rope (or cable) 113 (113-1, 113-2). The pulleys 111 are both coupled to the gimbal assembly 104.

The ropes 113 are each coupled to, and may also be wrapped around, one of the motors 106. More specifically, the ropes 113 pass through an opening 201 (shown in FIG. 2) in an output shaft and pulley 107 of its associated motor 106, or through an opening in suitable, non-illustrated hardware connected to the output shaft and pulley 107. It is also noted that for increased torque advantage, the motor may in fact be a gear motor (motor with gear head). Preferably, an epoxy is disposed in these passages 201 to help secure the ropes 113 in place. Each rope 113 is also disposed on, and thus engages, at least a portion of its associated pulley 111, and more specifically the outer surface 115 of its associated pulley 111. Each rope 113 thus receives a drive torque from its associated motor 106 and, in response, causes its associated pulley 111 to rotate at increased torque (according to the diameter ratio of 107 and 111). Each rope 113 may be variously implemented and may be formed of various materials. For example, each rope 113 may be formed of a single strand or a plurality of strands of various materials.

Figure 2:
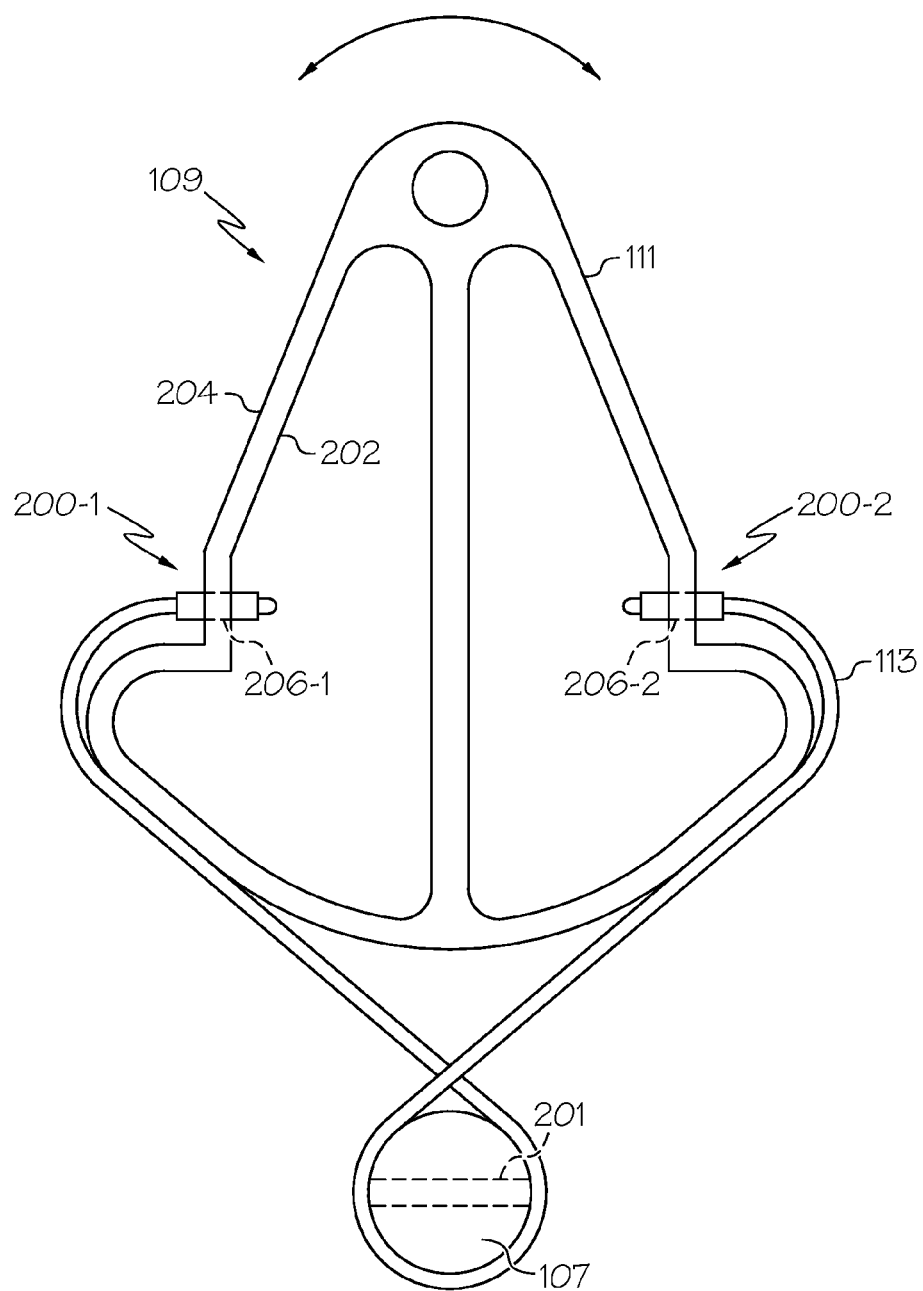
FIG. 2 depicts an embodiment of a rope drive system that may be used in the system of FIG. 1.

Referring now to FIG. 2, an embodiment of one of the rope drive systems 109 is depicted, and includes the pulley 111, the rope 113, and a plurality of rope drive anchoring assemblies 200 (200-1, 200-2). The pulley 111 includes an inner surface 202, an outer surface 204, and a pair of fastener openings 206 (206-1, 206-2). It will be appreciated that the depicted pulley 111 is merely exemplary of one embodiment, and that the pulley 111 may be variously configured and implemented. As such, the pulley 111 could be variously shaped, and could be implemented with only a single fastener opening 206 or with more than two fastener openings 206, if needed or desired. Regardless of the number of fastener openings 206, each fastener opening 206 extends between the inner surface 202 and the outer surface 204. A single fastener provides a stiffer system, while two fasteners provide a more length tolerant system.

Figure 3:
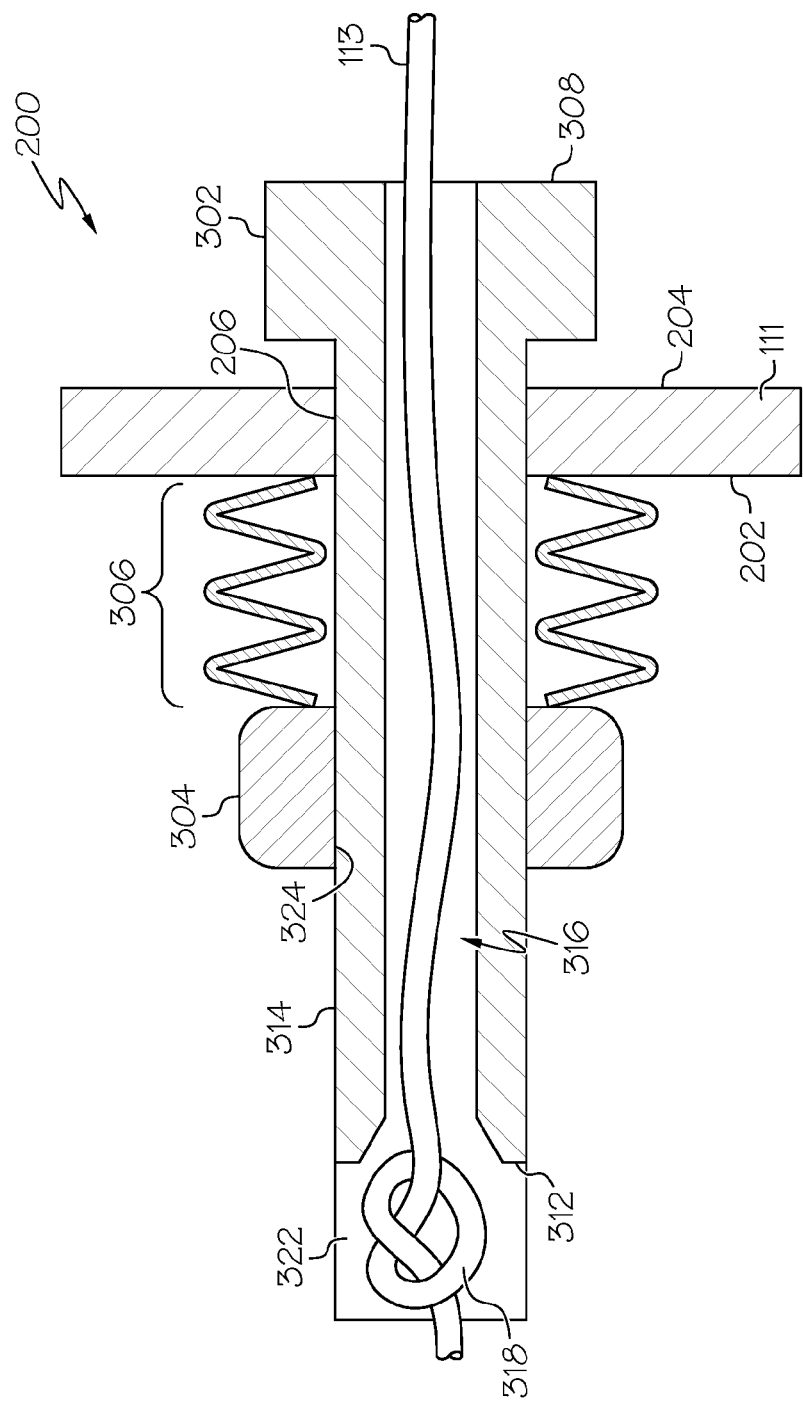
FIG. 3 depicts an embodiment of a rope drive anchoring assembly.

The rope drive anchoring assemblies 200 extend, one each, through a fastener opening 206, and couple the rope 113 to the pulley 111. An embodiment of one of the rope drive anchoring assemblies 200, and how it couples the rope 113 to the pulley 111, is depicted in FIG. 3, and with reference thereto will now be described.

Each rope drive anchoring assembly 200 includes a fastener 302, a threaded bolt 304, and a spring 306. The fastener 302 extends through one of the fastener openings 206, and has a first end 308, a second end 312, an outer surface 314, and an opening 316. The outer surface 314 has fastener threads formed on at least a portion thereof, and the opening 316 extends between the first and second ends 308, 312. As FIG. 3 also depicts, the rope 113, which has two terminations 318 (only one shown in FIG. 3), extends through the opening 316 between the first and second ends 308, 312. Each termination 318 extends from the second end 312 of the fastener 302 and is configured (e.g., knotted) to prevent movement thereof through the second end 312 and into the opening 316. In addition, an epoxy 322 is deposited into, and fills, the opening 316 to adhere the rope 113 in the opening 316.

The threaded bolt 304 has threads formed on its inner surface 324. These threads mate with the threads formed on the outer surface 314 of the fastener 302, which allows the threaded bolt 304 to be threaded onto the fastener 302. The spring 306 is disposed between the threaded bolt 304 and the inner surface 202 of the pulley 111. The spring 306 may be variously configured and implemented. For example, it may be implemented as a coil spring, or a machined spring. In the depicted embodiment, however, the spring 306 is implemented using a plurality of Belleville washers.

The threaded bolt 304 is disposed on the fastener 302 to supply a preload to the spring 306. The preloaded spring 306 allows for small variations in rope length due, for example, to creep and temperature changes, while still retaining appropriate tension in the rope. Moreover, the preload of the spring 306 maintains the rope drive system 109 relatively stiff across the range of operating loads. The rope drive anchoring assembly 200 also provides adjustability, and exhibits no (or very little) backlash.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A rope drive anchoring assembly, comprising:
  a pulley adapted to be rotationally mounted and having an inner surface, an outer surface, a first fastener opening extending between the inner and outer surfaces, and a second fastener opening extending between the inner and outer surfaces;
  a rope engaging at least a portion of the outer surface of the pulley, the rope adapted to receive a drive torque and, in response, cause the pulley to rotate;
  a first rope connector coupling the rope to the pulley; and
  a second rope connector coupling the rope to the pulley, wherein:
    the first rope connector comprises:
      a first fastener extending through the first fastener opening, the first fastener having a first end, a second end, an outer surface, and an opening extending between the first and second ends and through which the rope extends, the outer surface having fastener threads formed on at least a portion thereof,
      a first threaded bolt threaded onto the fastener threads, and
      a first spring disposed between the threaded bolt and the inner surface of the pulley;
    and the second rope connector comprises:
      a second fastener extending through the fastener opening, the second fastener having a first end, a second end, an outer surface, and an opening extending between the first and second ends and through which the rope extends, the outer surface of the second fastener having fastener threads formed on at least a portion thereof,
      a second threaded bolt threaded onto the fastener threads of the second fastener, and
      a second spring disposed between the second threaded bolt and the inner surface of the pulley.

2. The assembly of claim 1, wherein the first and second springs each comprise a plurality of Belleville washers.

3. The assembly of claim 1, wherein the first and second springs each comprise a coil spring.

4. The assembly of claim 1, wherein the first and second threaded bolts are each disposed to supply a preload to the spring.

5. The assembly of claim 1, further comprising an epoxy disposed within the openings of the first and second fasteners.

6. The assembly of claim 1 wherein the rope includes a termination that extends from the second ends of the first and second fasteners and is configured to prevent movement thereof through the second ends and into the openings.

7. A drive system, comprising:
- a motor having an output shaft, the motor adapted to be energized and configured, upon being energized, to supply a drive torque via the output shaft;
- a pulley adapted to be rotationally mounted and having an inner surface, an outer surface, a first fastener opening extending between the inner and outer surfaces, and a second fastener opening extending between the inner and outer surfaces;
- a rope engaging the output shaft and at least a portion of the outer surface of the pulley, the rope responsive to the drive torque to cause the pulley to rotate;
- a first rope connector coupling the rope to the pulley; and
- a second rope connector coupling the rope to the pulley, wherein:
    the first rope connector comprises:
        a first fastener extending through the first fastener opening, the first fastener having a first end, a second end, an outer surface, and an opening extending between the first and second ends and through which the rope extends, the outer surface having fastener threads formed on at least a portion thereof,
        a first threaded bolt threaded onto the fastener threads, and
        a first spring disposed between the threaded bolt and the inner surface of the pulley;
    and the second rope connector comprises:
        a second fastener extending through the fastener opening, the second fastener having a first end, a second end, an outer surface, and an opening extending between the first and second ends and through which the rope extends, the outer surface of the second fastener having fastener threads formed on at least a portion thereof,
        a second threaded bolt threaded onto the fastener threads of the second fastener, and
        a second spring disposed between the second threaded bolt and the inner surface of the pulley.

8. The system of claim 7, wherein the first and second springs each comprise a plurality of Belleville washers.

9. The system of claim 7, wherein the first and second springs each comprise a coil spring.

10. The system of claim 7, wherein the first and second threaded bolts are each disposed to supply a preload to the spring.

11. The system of claim 7, further comprising an epoxy disposed within the openings of the first and second fasteners.

12. The system of claim 7, wherein the rope includes a termination that extends from the second ends of the first and second fasteners and is configured to prevent movement thereof through the second ends and into the openings.

* * * * *